US012376664B2

(12) United States Patent
Hyun et al.

(10) Patent No.: US 12,376,664 B2
(45) Date of Patent: Aug. 5, 2025

(54) VIBRATING MODULE AND MAKEUP TOOL INCLUDING SAME

(71) Applicant: LG HOUSEHOLD & HEALTH CARE LTD., Seoul (KR)

(72) Inventors: Chang Hwan Hyun, Seoul (KR); Hyeon Jeong Kim, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 899 days.

(21) Appl. No.: 17/620,202

(22) PCT Filed: Jun. 18, 2020

(86) PCT No.: PCT/KR2020/007904

§ 371 (c)(1),
(2) Date: Dec. 17, 2021

(87) PCT Pub. No.: WO2020/256433

PCT Pub. Date: Dec. 24, 2020

(65) Prior Publication Data

US 2022/0240642 A1 Aug. 4, 2022

(30) Foreign Application Priority Data

Jun. 18, 2019 (KR) ........................ 10-2019-0072184
Jun. 12, 2020 (KR) ........................ 10-2020-0071486

(51) Int. Cl.
*A45D 33/36* (2006.01)
*A61H 23/02* (2006.01)
*A45D 33/00* (2006.01)

(52) U.S. Cl.
CPC ............. *A45D 33/36* (2013.01); *A61H 23/02* (2013.01); *A45D 2033/001* (2013.01); *A45D 2200/207* (2013.01)

(58) Field of Classification Search
CPC ........ A45D 33/36; A45D 33/00; A45D 33/34; A45D 33/30; A45D 33/005;
(Continued)

(56) References Cited

U.S. PATENT DOCUMENTS 4,228,793 A * 10/1980 Ramey ............... A61H 23/0218 601/57
2006/0258962 A1* 11/2006 Kopanic ............ A61H 23/0263 601/57
(Continued)

FOREIGN PATENT DOCUMENTS

CN 205813888 U 12/2016
CN 107240514 A 10/2017
(Continued)

OTHER PUBLICATIONS

KR 101551231 machine translation (Year: 2015).*
(Continued)

*Primary Examiner* — Victoria Murphy
*Assistant Examiner* — Sara K Toich
(74) *Attorney, Agent, or Firm* — Birch, Stewart, Kolasch & Birch, LLP

(57) ABSTRACT

A vibrating module and a makeup tool including the vibrating module are proposed. The vibrating module includes a vibration device detachably attached to a makeup tool and attached to the makeup tool to transfer vibration, and a handle component coupled with the vibration device, made in the form of a pair of folding wings, and configured to drive the vibration device when the first and second wings are folded and contact each other.

19 Claims, 17 Drawing Sheets

(58) Field of Classification Search

CPC ...... A45D 2200/207; A45D 2200/1009; A45D 2200/1018; A45D 40/26; A45D 40/28; A45D 34/04; A61H 2201/105; A61H 23/00; A61H 23/02–0263; A61H 2023/002; A61H 2023/0209–029; A61H 2023/001; A46B 13/023; H01H 13/12; H01H 13/14; H01H 13/183; H01H 13/22; H01H 13/84; H01H 19/00; H01H 21/00; H01H 21/04; H01H 21/22; H01H 21/30; H01H 2003/00; H01H 2003/04; H01H 2003/22; H01H 2003/30; H01H 2003/008; E05B 45/06; E05F 15/004; A45C 2001/003

USPC .................................. 200/293.1; 604/165.03

See application file for complete search history.

(56) References Cited

U.S. PATENT DOCUMENTS

| | | | | |
|---|---|---|---|---|
| 2012/0128399 | A1 | 5/2012 | Limongi et al. | |
| 2012/0291798 | A1 | 11/2012 | Park et al. | |
| 2015/0250287 | A1 * | 9/2015 | Yoo | A45D 33/04 401/130 |

FOREIGN PATENT DOCUMENTS

| | | | | | |
|---|---|---|---|---|---|
| JP | 14-000232 | Y1 | | 1/1939 | |
| JP | 57-17635 | U | | 1/1982 | |
| JP | 2013-532995 | A | | 8/2013 | |
| KR | 200399929 | Y1 | * | 11/2005 | A45D 33/34 |
| KR | 20-20080002962 | U | | 7/2008 | |
| KR | 10-1058359 | B1 | | 8/2011 | |
| KR | 10-1107002 | B1 | | 1/2012 | |
| KR | 10-1160257 | B1 | | 7/2012 | |
| KR | 10-1249944 | B1 | | 4/2013 | |
| KR | 10-1257229 | B1 | | 5/2013 | |
| KR | 20-2013-0003237 | U | | 5/2013 | |
| KR | 10-1282022 | B1 | | 7/2013 | |
| KR | 10-2015-0081712 | A | | 7/2015 | |
| KR | 101551231 | B1 | * | 9/2015 | A45D 33/36 |
| KR | 101724410 | B1 | * | 4/2017 | A45D 33/34 |
| KR | 101946923 | B1 | * | 2/2019 | A45D 33/36 |
| KR | 200488758 | Y1 | * | 3/2019 | A45D 33/00 |
| KR | 10-2020678 | B1 | | 9/2019 | |
| KR | 10-2081151 | B1 | | 2/2020 | |
| KR | 102081150 | B1 | * | 11/2020 | A45D 33/34 |

OTHER PUBLICATIONS

KR 200399929 machine translation (Year: 2005).*
KR 101946923 machine translation (Year: 2019).*
KR 200488758 machine translation (Year: 2019).*
KR 102081150 machine translation (Year: 2020).*
KR 101724410 machine translation (Year: 2017).*
International Search Report, issued in PCT/KR2020/007904, PCT/ISA/210, dated Sep. 29, 2020.

* cited by examiner

VIBRATING MODULE AND MAKEUP TOOL INCLUDING SAME

CROSS REFERENCE TO RELATED APPLICATIONS

This application is the National Phase of PCT/KR2020/007904 filed on Jun. 18, 2020, which claims priority under 35 U.S.C. § 119 (a) to Patent Application Nos. 10-2019-0072184 and 10-2020-0071486 filed in the Republic of Korea on Jun. 18, 2019 and Jun. 12, 2020, respectively, all of which are hereby expressly incorporated by reference into the present application.

TECHNICAL FIELD

Various embodiments of the present disclosure relate to a vibrating module and a makeup tool including the vibrating module, and more particularly, to a vibrating module and a makeup tool including the vibrating module, in which the vibrating module is attached to various types of makeup tools to function as a handle of the makeup tool and vibrate the makeup tool, the handle is made in the form of a pair of folding wings, and the wings of the handle are provided with current carrying panels, so the wings are folded to cause the current carrying panels to contact each other, thus generating vibration.

BACKGROUND ART

Generally, a puff for applying powder, cake, cream or gel type of cosmetics to the skin, or a cleanser for wiping off cosmetics applied to the skin are widely used as a makeup tool.

The puff is generally configured such that a band for hanging on the finger is attached to a side opposite to a side where cosmetics are to be applied, so the puff is used by fitting the finger into the band, putting cosmetics on a side opposite to the band, and dabbing the cosmetics on the skin.

The cleanser is used to wipe off cosmetics applied to the skin unlike the puff. The cleaner sometimes wipes off cosmetics by tapping.

A vibrating makeup tool is commercially available, which is configured such that a vibrating function is added to a makeup tool such as the puff or the cleanser used for the same purpose as above, thereby allowing cosmetics to be quickly and evenly applied to or wiped off from the skin.

The commercially available vibrating makeup tool is problematic in that a vibrating module for performing vibration is integrated with a makeup tool, so a dedicated product for each makeup tool should be used.

Further, switches used in the existing vibrating makeup tool are classified into a slide type switch, a touch type switch, and a magnetic sensing type switch. These switches are components that occupy a space in the vibrating makeup tool. The slide type switch is problematic in that it should be operated by a user from an outside, so a cover is required. The touch type switch is problematic in that a control board should be placed. The magnetic sensing type switch is problematic in that it may malfunction when coming in touch with a magnet used for a lock decoration of a bag, for example.

Such a vibrating makeup tool is problematic in that it should be provided with the switch, thus causing an increase in manufacturing cost due to the added components.

These problems deteriorate consumers' satisfaction with a product, thus adversely affecting product sales. The development of a vibrating makeup tool that can solve the above problems, has a simple structure, and can enhance consumers' satisfaction is continuously being made.

DISCLOSURE

Technical Problem

Various embodiments of the present disclosure are directed to a vibrating module and a makeup tool including the vibrating module, in which the vibrating module is detachably attached to various types of makeup tools, and is configured to vibrate the makeup tool while functioning as a handle of the makeup tool, so the vibrating module can be applied to various types of makeup tools in a compatible manner.

Further, various embodiments of the present disclosure are directed to a vibrating module and a makeup tool including the vibrating module, in which a handle is made in the form of a pair of folding wings, the wings of the handle are provided with current carrying panels, so the wings are folded to cause the current carrying panels to contact each other, thus generating vibration, and thereby allowing a switch structure to be simplified.

Furthermore, various embodiments of the present disclosure are directed to a vibrating module and a makeup tool including the vibrating module, in which a handle is made in the form of a pair of folding wings, and the wings of the handle themselves have the function of a current carrying panel, so a separate current carrying panel is not required, thus allowing an entire configuration to be simplified.

Furthermore, various embodiments of the present disclosure are directed to a vibrating module and a makeup tool including the vibrating module, in which a short-circuit preventing component made of elastic material having electric insulation is provided between both wings of a handle having the function of a current carrying panel, so both the wings are not in contact with each other unless a certain external pressure is applied, thus preventing an electric short-circuit from occurring even if both the wings are configured to be freely rotatable.

Technical Solution

According to an aspect of the present disclosure, a vibrating module may include a vibration device detachably attached to a makeup tool, and attached to the makeup tool to transfer vibration; and a handle component coupled with the vibration device, made in a form of a pair of folding wings, and configured to drive the vibration device when the first and second wings are folded and contact each other.

The vibration device may include a vibration plate detachably attached to the makeup tool, with the handle component being mounted on an upper surface thereof; a vibrator mounted on the upper surface of the vibration plate to generate vibration; a power supply component installed in the handle component to supply power to the vibrator; and a switch component installed in the handle component to control supply of the power from the power supply component to the vibrator.

The power supply component may include at least any one of a first battery and a second battery, the first battery may be disposed on the first wing, be connected at an anode surface thereof through a first lead wire to the vibrator, and be connected at a cathode surface thereof to the switch component, and the second battery may be disposed on the second wing, be connected at a cathode surface thereof through a second lead wire to the vibrator, and be connected at an anode surface thereof to the switch component.

The switch component may include a first current carrying panel and a second current carrying panel, the first current carrying panel may be installed at the first wing, be brought into contact with and connected to the cathode surface of the first battery when the first battery is disposed on the first wing, and be connected to the first lead wire when the first battery is omitted, and the second current carrying panel may be installed at the second wing, be brought into contact with and connected to the anode surface of the second battery when the second battery is disposed on the second wing, and be connected to the second lead wire when the second battery is omitted.

The first current carrying panel may be installed at an inside of the first wing, the second current carrying panel may be installed at an inside of the second wing to be opposite to the first current carrying panel, and the first and second current carrying panels may contact to be electrically connected to each other when the first and second wings contact each other regardless of pressure acting on the first and second wings.

The first current carrying panel may be installed in a concave first elastic groove defined in the first wing, the second current carrying panel may be installed in a concave second elastic groove defined in the second wing to be opposite to the first elastic groove, and the first and second current carrying panels may contact to be electrically connected to each other when the first and second wings of the first and second elastic grooves are pressed over a certain pressure in a state where the first and second wings contact each other.

The vibrating module may further include a first elastic bar provided on an inner surface of the first wing to have a certain inner inclination; and a second elastic bar provided to be opposite to the first elastic bar and provided on an inner surface of the second wing to have a certain inner inclination. The first current carrying panel may be installed at an inside of the first wing, the second current carrying panel may be installed at an inside of the second wing to be opposite to the first current carrying panel, and the first and second current carrying panels may contact to be electrically connected to each other as the angle of the first and second elastic bars is reduced when the first and second wings are pressed over a certain pressure in a state where the first and second wings are folded and the first and second elastic bars contact each other.

Each of the first and second current carrying panels may be installed in a groove defined in each of the first and second wings, and be installed such that an outer surface thereof is parallel to an inner surface of each of the first and second wings, and each of the first and second elastic bars may be inserted into another groove defined in each of the first and second wings to cause the first and second current carrying panels to contact each other as the angle is reduced if a certain pressure is applied, and return to an original state thereof if the certain pressure is released.

The handle component may further include a fixing plate on which the first wing and the second wing are mounted. The vibration device may include a vibration plate detachably attached to the makeup tool, and coupled with the fixing plate; a vibrator mounted on an upper surface of the vibration plate to generate vibration; a power supply component mounted on the upper surface of the vibration plate to supply power to the vibrator; and a switch component installed in the handle component to control supply of the power from the power supply component to the vibrator.

The power supply component may include at least any one of a first battery and a second battery, the first battery may be disposed on a first side of the vibrator, is connected at an anode surface thereof through a first lead wire to the vibrator, and be connected at a cathode surface thereof through a first connecting line to the switch component, and the second battery may be disposed on a second side of the vibrator, be connected at a cathode surface thereof through a second lead wire to the vibrator, and be connected at an anode surface thereof through a second connecting line to the switch component.

The switch component may include a first current carrying panel and a second current carrying panel, the first current carrying panel may be installed at an inside of the first wing, be connected through the first connecting line to the cathode surface of the first battery when the first battery is disposed on the vibration plate, and be connected to the first lead wire when the first battery is omitted, and the second current carrying panel may be installed at an inside of the second wing, be connected through the second connecting line to the anode surface of the second battery when the second battery is disposed on the vibration plate, and be connected to the second lead wire when the second battery is omitted, and the first and second current carrying panels may be electrically connected to vibrate the vibrator when the first and second wings contact each other regardless of pressure acting on the first and second wings, or be electrically connected to vibrate the vibrator when the first and second wings are pressed over a certain pressure regardless of whether the first and second wings contact each other.

The makeup tool may be a puff, a cleanser, an applicator, a pen, or a brush.

The handle component may generate vibration on an application surface regardless of whether the application surface contacts skin, if handle components are folded in a direction where they are erected towards an opposite side of the application surface of the makeup tool and then contact each other.

According to an aspect of the present disclosure, a vibrating module may include a vibration device detachably attached to a makeup tool, and attached to the makeup tool to transfer vibration; a handle component rotatably assembled with the vibration device by a first hinge and a second hinge, made in a form of a pair of folding wings, and configured to drive the vibration device when the first and second wings are folded and contact each other, thus transferring vibration to the makeup tool; and a short-circuit preventing component provided between the first wing and the second wing, and causing the first wing and the second wing to contact each other only when an external force is applied.

At least one short-circuit preventing component may be provided between the first wing and the second wing to protrude on the vibration device, and be formed of elastic material having electric insulation.

The short-circuit preventing component may include at least one first short-circuit preventing member provided on an inner surface of the first wing; and at least one second short-circuit preventing member provided on an inner surface of the second wing to be opposite to the first short-circuit preventing member. At least any one of the first short-circuit preventing member and the second short-circuit preventing member may be formed of elastic material having electric insulation.

The short-circuit preventing component may include a first short-circuit preventing member provided on the first hinge; a second short-circuit preventing member provided on the second hinge; a third short-circuit preventing member provided on the first wing to be opposite to the first short-circuit preventing member; and a fourth short-circuit preventing member provided on the second wing to be opposite to the second short-circuit preventing member, and the first to fourth short-circuit preventing members may be formed of elastic material.

The vibration device may include a vibrator configured to transfer vibration to a vibration plate; and a power supply component configured to supply power to the vibrator, and each of the first and second wings may be formed of conductive material and be connected to the power supply component to perform a switch function for controlling the supply of power to the vibrator.

The makeup tool may be a puff, a cleanser, an applicator, a pen, or a brush.

Advantageous Effects

A vibrating module and a makeup tool including the vibrating module according to the present disclosure are advantageous in that the vibrating module is detachably attached to various types of makeup tools, and is configured to vibrate the makeup tool while functioning as a handle of the makeup tool, so the vibrating module can be applied to various types of makeup tools in a compatible manner.

Further, a vibrating module and a makeup tool including the vibrating module according to the present disclosure are advantageous in that a handle is made in the form of a pair of folding wings, the wings of the handle are provided with current carrying panels, so the wings are folded to cause the current carrying panels to contact each other, thus generating vibration, and thereby allowing a switch structure to be simplified.

Furthermore, a vibrating module and a makeup tool including the vibrating module according to the present disclosure are advantageous in that a handle is made in the form of a pair of folding wings, and the wings of the handle themselves have the function of a current carrying panel, so a separate current carrying panel is not required, thus allowing an entire configuration to be simplified.

Furthermore, a vibrating module and a makeup tool including the vibrating module according to the present disclosure are advantageous in that a short-circuit preventing component made of elastic material having electric insulation is provided between both wings of a handle having the function of a current carrying panel, so both the wings are not in contact with each other unless a certain external pressure is applied, thus preventing an electric short-circuit from occurring even if both the wings are configured to be freely rotatable.

MODE FOR INVENTION

Figure 1:
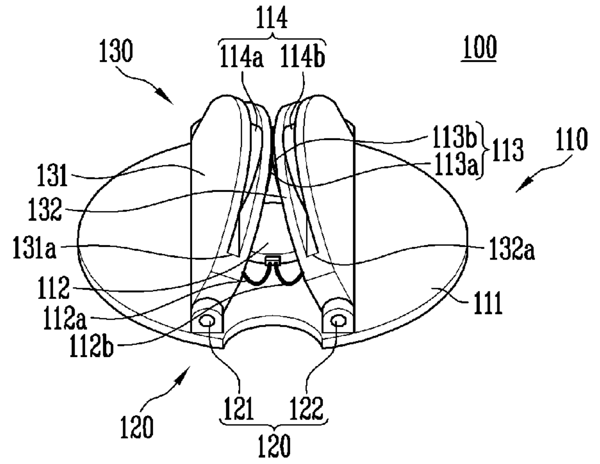
FIG. 1 is a perspective view of a vibrating module according to a first embodiment of the present disclosure.

The above and other objectives, features, and advantages of the present disclosure will be easily understood from the following preferred embodiments in conjunction with the accompanying drawings. It should be noted that the same reference numerals are used throughout the drawings to designate the same or similar components. When it is determined that the detailed description of the related art may obscure the gist of the present disclosure, the detailed description will be omitted.

Hereinafter, preferred embodiments of the present disclosure will be described in detail with reference to the accompanying drawings.

Figure 2:
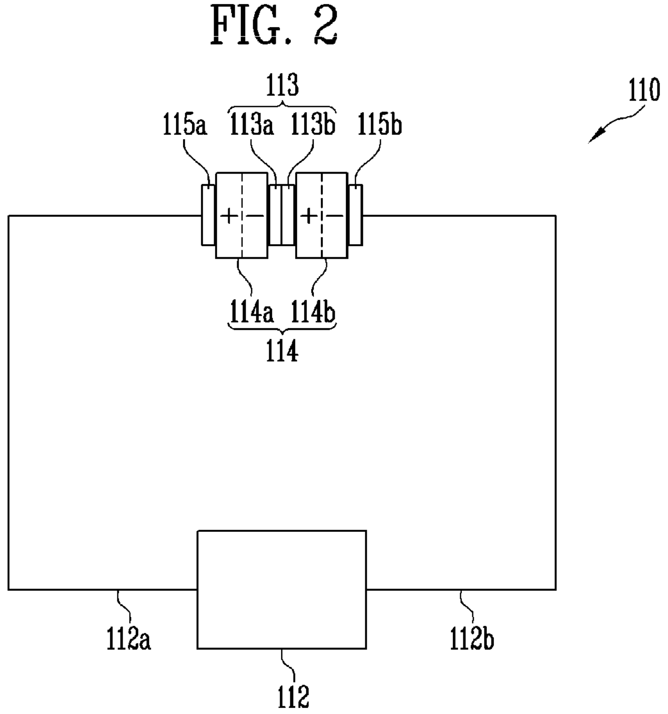
FIG. 2 is a circuit diagram of the vibrating module according to the first embodiment of the present disclosure.
Figure 3:
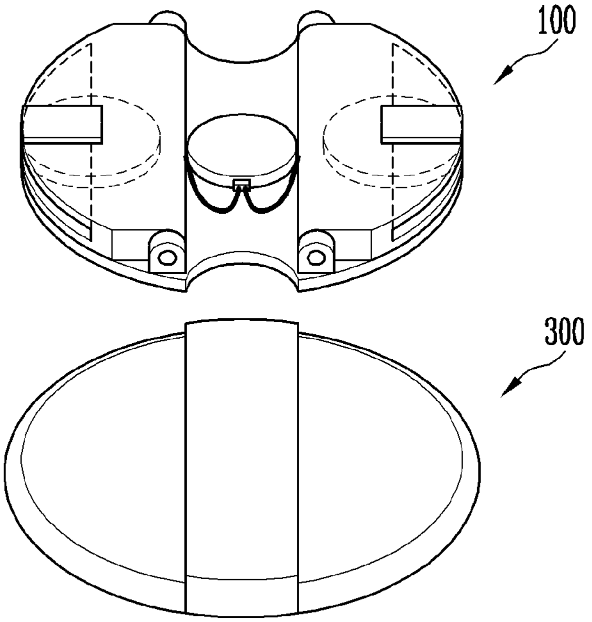
FIG. 3 is a diagram illustrating a state before the vibrating module according to the first embodiment of the present disclosure is mounted on a makeup tool.
Figure 4A:
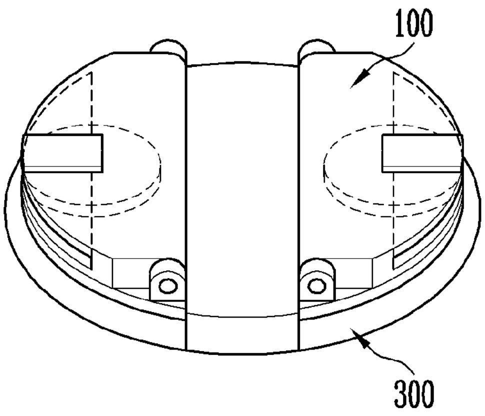
FIGS. 4A and 4B are diagrams illustrating a state after the vibrating module according to the first embodiment of the present disclosure is mounted on the makeup tool.
Figure 4B:
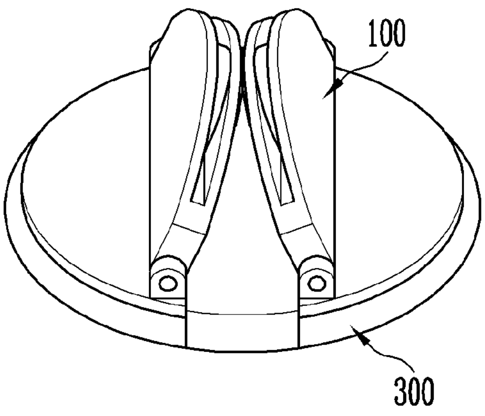

FIG. 1 is a perspective view of a vibrating module according to a first embodiment of the present disclosure, FIG. 2 is a circuit diagram of the vibrating module according to the first embodiment of the present disclosure, FIG. 3 is a diagram illustrating a state before the vibrating module according to the first embodiment of the present disclosure is mounted on a makeup tool, and FIGS. 4A and 4B are diagrams illustrating a state after the vibrating module according to the first embodiment of the present disclosure is mounted on the makeup tool.

Referring to FIGS. 1, 4A, and 4B, a vibrating module 100 according to the first embodiment of the present disclosure may be detachably attached to a makeup tool 300, may function as a handle of the makeup tool 300, may vibrate the makeup tool 300, and may include a vibrating device 110, a coupler 120, and a handle component 130.

In this embodiment, the makeup tool 300 may be a conventional puff having an application surface for applying powder, cake, cream or gel type of cosmetics to the skin, or a conventional cleanser for wiping off cosmetics applied to the skin, an applicator, a pen, a brush, etc., and the shape or material thereof is not limited. Hereinafter, a case where the makeup tool 300 is a puff is described as an example. The puff may be provided with a band- or opening-type handle to allow a user to easily use the makeup tool. Of course, there may be a product having no handle.

The vibrating device 110 may be driven regardless of whether the application surface contacts the skin (even though the application surface is not pressed by the skin) when both wings of a pair of folding wing type handle components 130 are folded in a direction where they are erected towards the opposite side of the application surface of the puff, and then contact each other, and may be attached to the makeup tool 300 to transfer vibration.

The vibrating device 110 may be coupled with the handle component 130 in various coupling methods such as an integral coupling method or an assembling method, and may be detachably attached to the makeup tool 300.

Such a vibrating device 110 may include a vibration plate 111, a vibrator 112, a switch component 113, and a power supply component 114.

The handle component 130 may be mounted on the upper surface of the vibration plate 111.

The vibration plate 111 may be coupled with the handle component 130 in various coupling methods such as an integral coupling method or an assembling method, and may be fitted into a band or opening for the handle of the makeup tool 300 to be attached while contacting a surface of the makeup tool 300, thus allowing the vibrating force generated from the vibrator 112 to be uniformly transmitted to the makeup tool 300. The vibration plate 111 may be of a flat plate structure having no edge wall.

In case that the makeup tool 300 is flat while having no band or opening for the handle, the lower surface of the vibration plate 111 may be formed of a magic tape type to easily attach the vibration plate 111 to a surface of the makeup tool 300. Even if the makeup tool 300 has the band or opening for the handle to enable easy attachment, the lower surface of the vibration plate 111 may be formed of the magic tape type, and thereby the bond strength with the makeup tool 300 may be increased.

In case that the vibration plate 111 and the handle component 130 are manufactured in an assembling method, a coupler 120 may be provided on an upper surface of the vibration plate to assemble the vibration plate with the handle component 130. Further, the vibrator 112 may be mounted on the upper surface of the vibration plate 111.

The vibrator 112 may be mounted on the upper surface of the vibration plate 111, and may receive power from the power supply component 114 to generate vibration.

The vibrator 112 may be installed at the central portion of the vibration plate 111 to evenly transfer vibration throughout the vibration plate 111. The vibrator 112 may be disposed between first and second wings 131 and 132 forming both wings of the pair of folding wing type handle components 130, and may be disposed in other portions.

When both wings of the pair of folding wing type handle components 130 are folded and contact each other, such a vibrator 112 may be provided with a first lead wire **112*a* and a second lead wire 112*b* to receive power from the power supply component 114**.

The first lead wire **112*a* may be connected to an anode surface of the first battery 114*a* when the first battery 114*a* of the power supply component 114 is disposed on the first wing 131. At this time, the first lead wire 112*a* may be connected to the first battery 114*a* via a first fixing clip 115*a*. However, in case that the first battery 114*a* of the power supply component 114 is omitted, the first lead wire 112*a* may be directly connected to the first current carrying panel 113*a***.

The second lead wire **112*b* may be connected to a cathode surface of the second battery 114*b* when the second battery 114*b* of the power supply component 114 is disposed on the second wing 132. At this time, the second lead wire 112*b* may be connected to the second battery 114*b* via a second fixing clip 115*b*. However, in case that the second battery 114*b* of the power supply component 114 is omitted, the second lead wire 112*b* may be directly connected to the second current carrying panel 113*b***.

Figure 7A:
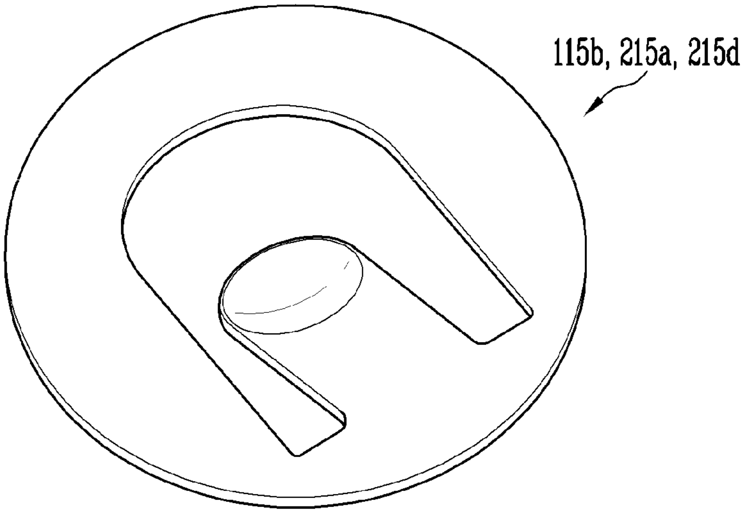
FIGS. 7A and 7B are diagrams illustrating a fixing clip for connecting an electric wire to a battery.
Figure 7B:
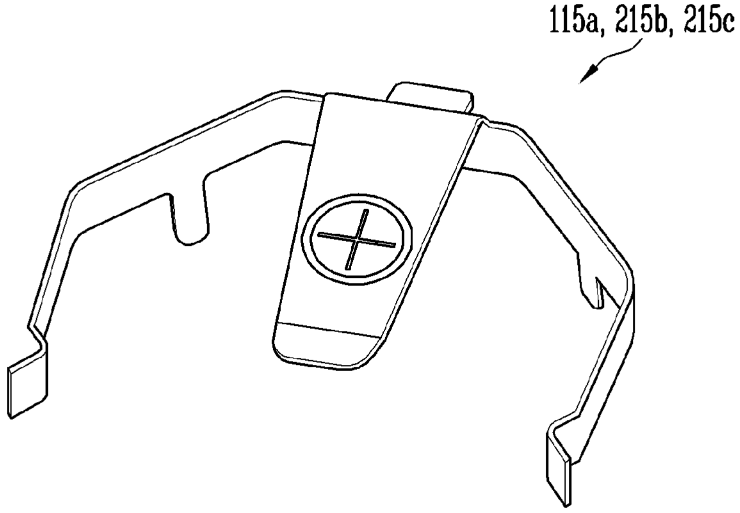

In the above, the first fixing clip **115*a* may be a positive-pole fixing clip shown in FIG. 7B, and the second fixing clip 115*b* may be a negative-pole fixing clip shown in FIG. 7**A.

The switch component 113 may control the supply of power from the power supply component 114 to the vibrator 112, and may be installed at a pair of folding wing type handle components 130. The switch component 113 may include a first current carrying panel **113*a* and a second current carrying panel 113*b***.

The first current carrying panel **113*a* may be installed at an inside of the first wing 131, may be brought into contact with and connected to the cathode surface of the first battery 114*a* in case that the first battery 114*a* of the power supply component 114 is disposed on the first wing 131, and may be directly connected to the first lead wire 112*a* of the vibrator 112 in case that the first battery 114*a* of the power supply component 114** is omitted.

The second current carrying panel **113*b* may be installed at an inside of the second wing 132 to be opposite to the first current carrying panel 113*a*, may be brought into contact with and connected to the anode surface of the second battery 114*b* in case that the second battery 114*b* of the power supply component 114 is disposed on the second wing 132, and may be directly connected to the second lead wire 112*b* of the vibrator 112 in case that the second battery 114*b* of the power supply component 114** is omitted.

The first and second current carrying panels **113*a* and 113*b* contact each other when the first and second wings 131 and 132 are folded, thus allowing the power of the power supply component 114 to be supplied to the vibrator 112, and are separated from each other when the first and second wings 131 and 132 are unfolded, thus preventing the power of the power supply component 114 from being supplied to the vibrator 112**. In this way, the switching function of controlling the supply of power may be performed.

Furthermore, as described above, the first and second current carrying panels **113*a* and 113*b* may be electrically connected to vibrate the vibrator 112 when a user simply holds the first and second wings 131 and 132 to cause the wings to contact each other. However, in order for a user to use the makeup tool 300** without vibration, the first and second current carrying panels may be electrically connected to each other when a user presses the panels over a certain pressure.

To be more specific, at least any one of the first and second current carrying panels **113*a* and 113*b* may be formed of an elastic member for a power switch such that the first and second current carrying panels are not electrically connected to each other when a user lightly holds the first and second wings 131 and 132 and employs the makeup tool 300, while the first and second current carrying panels are electrically connected to each other when a user holds the first and second wings 131 and 132 and consciously presses the wings at a pressure exceeding a certain pressure level so as to provide a vibrating function to the makeup tool 300. In other words, at least any one of the first and second current carrying panels 113***a* and 113*b* may be configured to have a pressure switch function.

The elastic member for the power switch may be similar to a push button switch that is electrically turned on when a user presses the switch over a certain pressure and is electrically turned off when an external pressure is removed. The elastic member may be implemented variously without being limited thereto. The elastic modulus of the elastic member for the power switch may be adjusted to such an extent that a user does not feel uncomfortable when applying a certain pressure.

As described above, the first and second current carrying panels 113*a* and 113*b* may be configured such that the panels are electrically connected to vibrate the vibrator 112 when a user simply causes the first and second wings 131 and 132 to contact each other regardless of pressure acting on the first and second wings 131 and 132, or the panels are electrically connected to vibrate the vibrator 112 when a user presses the first and second wings 131 and 132 over a certain pressure to provide a vibrating function to the makeup tool 300 regardless of whether the first and second wings 131 and 132 contact each other.

As an example, as shown in FIGS. 8A to 8D, the first and second current carrying panels 113*a* and 113*b* are installed in concave elastic grooves EG defined in the first and second wings 131 and 132, and are installed such that the outer surfaces of the first and second current carrying panels do not protrude outwards from the first and second wings 131 and 132 and are positioned at certain depths inside the first and second wings. Here, the first and second wings 131 and 132 themselves are made of elastic material.

Figure 8A:
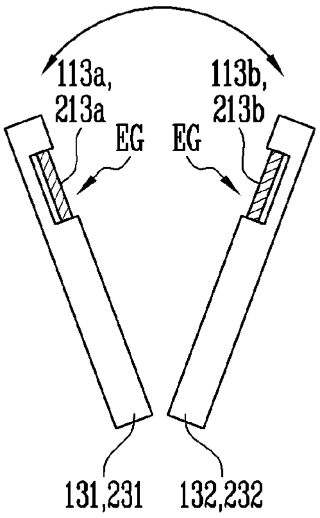
FIGS. 8A to 8D are diagrams illustrating another embodiment of a handle component and a current carrying panel installed therein, and the function of a pressure switch.
Figure 8B:
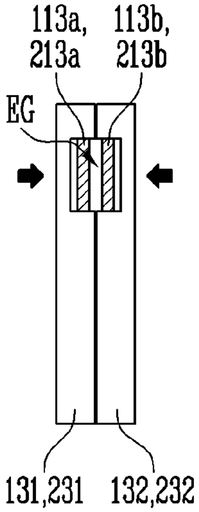
Figure 8C:
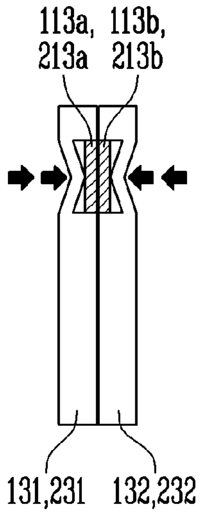
Figure 8D:
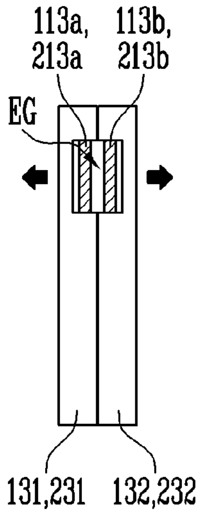

By installing the first and second current carrying panels 113*a* and 113*b* in this way, even if a user applies a certain pressure to use the makeup tool 300 and thereby cause the first and second wings 131 and 132 to contact each other, in a state where the first and second wings 131 and 132 are opened (see FIG. 8A), the first and second current carrying panels 113*a* and 113*b* do not contact each other (see FIG. 8B). In the state of FIG. 8B, a user may use the makeup tool 300 without the vibrating function.

If a user presses the first and second wings 131 and 132 over a certain pressure so as to provide the vibrating function to the makeup tool 300, the first and second wings 131 and 132 formed of the elastic material are deformed in the elastic groove EG and the first and second current carrying panels 113*a* and 113*b* contact each other to be electrically connected. Thereby, the vibrator 112 is vibrated, so that a user can use the makeup tool 300 having the vibrating function (see FIG. 8C).

If a user releases pressure from the first and second wings 131 and 132 in the state where the vibrating function is imparted to the makeup tool 300 (see FIG. 8C), the first and second wings 131 and 132 formed of the elastic material are returned to their original states in the elastic groove EG, so the first and second current carrying panels 113*a* and 113*b* are electrically disconnected from each other. Thereby, the vibrating function is released from the makeup tool 300 (see FIG. 8D).

As described above, according to this embodiment, when the first and second current carrying panels 113*a* and 113*b* are positioned in the concave elastic groove EG and a certain pressure is applied, the first and second wings 131 and 132 of the elastic material are deformed to be electrically connected, thus causing the vibrator 112 to be vibrated. Thereby, a user may optionally impart the vibrating function to the makeup tool 300.

As another example, as shown in FIGS. 9A to 9D, the first and second current carrying panels 113*a* and 113*b* are located in concave grooves defined in the first and second wings 131 and 132, such that outer surfaces of the first and second current carrying panels 113*a* and 113*b* are parallel to outer surfaces of the first and second wings 131 and 132, without protruding outwards from the first and second wings 131 and 132; or being positioned at a certain depth to inside of the first and second wings 131 and 132. Here, the first and second wings 131 and 132 themselves are formed of material other than the elastic material, for example, hard material, and are provided with elastic bars EB whose inner surfaces are formed of elastic material.

When there is no external pressure, the elastic bars EB form with the surfaces of the first and second wings 131 and 132 at a certain angle, for example, 10 degrees to 45 degrees. If the external pressure is applied, the angle is gradually reduced. When the pressure exceeds a certain level, the elastic bars become parallel to the surfaces of the first and second wings 131 and 132. If the external pressure is released, the elastic bars return to their original states. Grooves (unlabelled) corresponding to the elastic bars EB may be formed in the inner surfaces of the first and second wings 131 and 132 such that the elastic bars EB are parallel without protruding from the surfaces of the first and second wings 131 and 132, when the pressure exceeds a certain level.

Figure 9A:
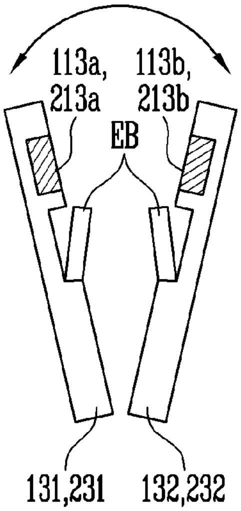
FIGS. 9A to 9D are diagrams illustrating another embodiment of a handle component and a current carrying panel installed therein, and the function of a pressure switch.
Figure 9B:
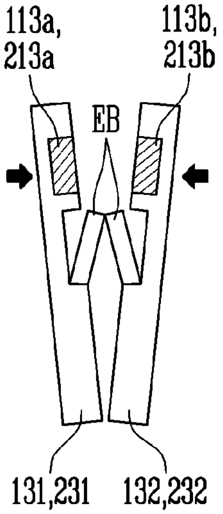
Figure 9C:
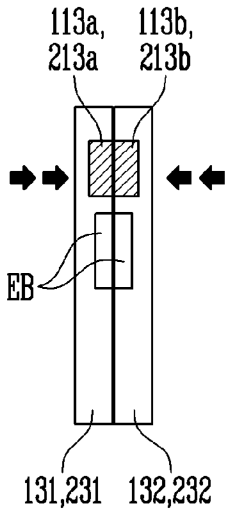

By installing the first and second current carrying panels 113*a* and 113*b* in this way, even if a user applies a certain pressure to use the makeup tool 300 and thereby cause the elastic bars EB provided in the first and second wings 131 and 132 to contact each other in the state where the first and second wings 131 and 132 are opened (see FIG. 9A), the first and second current carrying panels 113*a* and 113*b* do not contact each other (see FIG. 9B). In the state of FIG. 9B, a user may use the makeup tool 300 without the vibrating function.

If a user presses the first and second wings 131 and 132 over a certain pressure to impart the vibrating function to the makeup tool 300, the elastic bars EB formed of the elastic material are deformed to be parallel to the surfaces of the first and second wings 131 and 132 and the first and second current carrying panels 113*a* and 113*b* contact each other to form an electric connecting state. Thus, the vibrator 112 may be vibrated, so a user may use the makeup tool 300 having the vibrating function (see FIG. 9C).

Figure 9D:
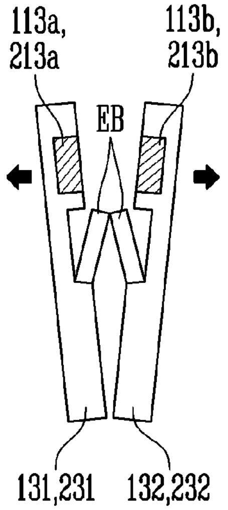

If a user releases pressure from the first and second wings 131 and 132 in the state where the vibrating function is imparted to the makeup tool 300 (see FIG. 9C), the elastic bars EB formed of the elastic material return to their original states, so the first and second current carrying panels 113*a* and 113*b* are electrically disconnected from each other, and thereby the vibrating function is released from the makeup tool 300 (see FIG. 9D).

As described above, according to this embodiment, when the first and second current carrying panels 113*a* and 113*b* are positioned in the grooves and pressure exceeds a certain level, the elastic bars EB of the elastic material provided in the first and second wings 131 and 132 are deformed to be electrically connected to each other, thus causing the vibrator 112 to be vibrated. Therefore, a user can optionally impart the vibrating function to the makeup tool 300.

The power supply component 114 may supply power to the vibrator 112, and may be a circular battery with one side being a positive pole and the other side being a negative pole.

The power supply component 114 may be disposed in at least any one of the first and second wings 131 and 132 of the pair of folding wing type handle components 130.

The power supply component 114 may include a first battery 114*a* and a second battery 114*b* in the case of being disposed in the first and second wings 131 and 132 of the handle components 130, respectively. This will be described below.

The first battery 114*a* may be inserted into a first groove 131*a* of the first wing 131. The anode surface of the first battery 114*a* may be connected to the first lead wire 112*a* of the vibrator 112 by the first fixing clip 115*a*, while the cathode surface thereof may be brought into contact with and connected to the first current carrying panel 113*a* of the switch component 113.

The second battery 114*b* may be inserted into a second groove 132*a* of the second wing 132. The cathode surface of the second battery 114*b* may be connected to the second lead wire 112*b* of the vibrator 112 by the second fixing clip 115*b*, while the anode surface thereof may be brought into contact with and connected to the second current carrying panel 113*b* of the switch component 113.

The first battery 114*a* and the second battery 114*b* may form a serial structure with the switch component 113 having the first and second current carrying panels 113*a* and 113*b* being interposed therebetween, thus supplying power to the vibrator 112.

In this case, an electrical circuit configuration for supplying the power of the power supply component 114 to the vibrator 112 may be formed of the anode of the first battery 114*a*->the first lead wire 112*a*->the vibrator 112->the second lead wire 112*b*->the cathode of the second battery 114*b*->the anode of the second battery 114*b*->the second current carrying panel 113*b*->the first current carrying panel 113*a*->the cathode of the first battery 114*a*, and may be formed of an open circuit or a close circuit depending on whether the first and second current carrying panels 113*a* and 113*b* contact each other.

When the power supply component 114 is disposed in any one of the first and second wings 131 and 132 of the handle component 130, either of the first battery 114*a* and the second battery 114*b* may be omitted. A case where the second battery 114*b* is omitted will be described below.

The first battery 114*a* may be inserted into the first groove 131*a* of the first wing 131. The anode surface of the first battery 114*a* may be connected to the first lead wire 112*a* of the vibrator 112 by the first fixing clip 115*a*, while the cathode surface thereof may be brought into contact with and connected to the first current carrying panel 113*a* of the switch component 113.

However, unlike the case where the power supply component 114 is disposed in each of the first and second wings 131 and 132 of the handle component 130, the second battery 114*b* is omitted, so the second current carrying panel 113*b* of the switch component 113 may be directly connected to the second lead wire 112*b* of the vibrator 112.

In this case, an electrical circuit configuration for supplying the power of the power supply component 114 to the vibrator 112 may be formed of the anode of the first battery 114*a*->the first lead wire 112*a*->the vibrator 112->the second lead wire 112*b*->the second current carrying panel 113*b*->the first current carrying panel 113*a*->the cathode of the first battery 114*a*, and may be formed of an open circuit or a close circuit depending on whether the first and second current carrying panels 113*a* and 113*b* contact each other.

When the power supply component 114 is disposed in any one of the first and second wings 131 and 132 of the handle component 130, either of the first battery 114*a* and the second battery 114*b* may be omitted. A case where the first battery 114*a* is omitted will be described below.

The second battery 114*b* may be inserted into the second groove 132*a* of the second wing 132. The cathode surface of the second battery 114*b* may be connected to the second lead wire 112*b* of the vibrator 112 by the second fixing clip 115*b*, while the anode surface thereof may be brought into contact with and connected to the second current carrying panel 113*b* of the switch component 113.

However, unlike the case where the power supply component 114 is disposed in each of the first and second wings 131 and 132 of the handle component 130, the first battery 114*a* is omitted, so the first current carrying panel 113*a* of the switch component 113 may be directly connected to the first lead wire 112*a* of the vibrator 112.

In this case, an electrical circuit configuration for supplying the power of the power supply component 114 to the vibrator 112 may be formed of the anode of the second battery 114*b*->the second current carrying panel 113*b*->the first current carrying panel 113*a*->the first lead wire 112*a*->the vibrator 112->the second lead wire 112*b*->the cathode of the second battery 114*b*, and may be formed of an open circuit or a close circuit depending on whether the first and second current carrying panels 113*a* and 113*b* contact each other.

The coupler 120 may be provided on the upper surface of the vibration plate 111 to assemble the handle component 130 with the vibration plate 111. The coupler 120 may include a first hinge 121 and a second hinge 122 to assemble the first and second wings 131 and 132 of the handle component 130.

The first hinge 121 may be installed on a first side with respect to a central line of the vibration plate 111, so the first wing 131 may be rotatably assembled via the first hinge, and the first wing 131 may be placed flat on the first side of the vibration plate 111 when no external force is applied.

The second hinge 122 may be installed on a second side with respect to the central line of the vibration plate 111 to be parallel with the first hinge, so the second wing 132 may be rotatably assembled via the second hinge, and the second wing 132 may be placed flat on the second side of the vibration plate 111 when no external force is applied.

The first and second hinges 121 and 122 may be installed to be spaced apart from each other by a certain distance. The spacing distance may preferably correspond to a width of the band serving as the handle of the makeup tool 300. This allows the vibrating module 100 to be easily attached to the makeup tool 300 by the band.

Of course, the coupler 120 may be omitted if the vibration plate 111 is manufactured integrally with the handle component 130.

The handle component 130 may be coupled with the method vibrating device 110 in various coupling methods such as an integral coupling method or an assembling method, and may function as the handle of the makeup tool 300 when the vibrating module 100 is attached to the makeup tool 300.

Furthermore, the handle component 130 may be of the pair of folding wing type structure, and may perform a switching function for driving the vibrating device 110 when both wings are folded to contact each other.

Such a handle component 130 may include the first wing 131 and the second wing 132.

The first and second wings 131 and 132 may be coupled with the vibration plate 111 in various coupling methods such as an integral coupling method or an assembling method, and may perform a switching function as well as the handle function of the makeup tool 300, when the vibrating module 100 is attached to the makeup tool 300.

Furthermore, the first and second wings 131 and 132 themselves may be formed of elastic material or material other than the elastic material, for example, hard material.

When the first and second wings 131 and 132 are coupled with the vibration plate 111 in an assembling method, they may be assembled with the vibration plate 111 by the coupler 120 that is provided on the upper surface of the vibration plate 111. This will be described below.

The first wing 131 may be assembled by the first hinge 121 of the coupler 120.

In the state where the first wing 131 is assembled by the first hinge 121, the first wing is rotatable. When no external force is applied, the first wing 131 may be placed flat on the first side of the vibration plate 111 by the first hinge 121.

In case that the first battery 114*a* of the power supply component 114 is disposed in the first wing 131, a first groove 131*a* may be formed in the first wing 131 to insert the first battery 114*a* therein. However, in case that the first battery 114*a* of the power supply component 114 is omitted, the first groove 131*a* may also be omitted.

The second wing 132 may be assembled by the second hinge 122 of the coupler 120.

In the state where the second wing 132 is assembled by the second hinge 122, the second wing is rotatable. When no external force is applied, the second wing 132 may be placed flat on the second side of the vibration plate 111 by the second hinge 122.

In case that the second battery 114*b* of the power supply component 114 is disposed in the second wing 132, a second groove 132*a* may be formed in the second wing 132 to insert the second battery 114*b* therein. However, in case that the second battery 114*b* of the power supply component 114 is omitted, the second groove 132*a* may also be omitted.

In case that the first and second wings 131 and 132 are manufactured integrally with the vibration plate 111, the coupler 120 including the first and second hinges 121 and 122 and provided on the upper surface of the vibration plate 111 may also be omitted, and the wings may be directly formed on the vibration plate 111. This will be described below.

The first wing 131 may be formed on the first side with respect to the central line of the vibration plate 111, and may be formed of elastic material so that the first wing remains inclined to the first side when no external force is applied, and returns to its original state when external force is applied to cause the first wing to contact the second wing 132 and then the external force is eliminated.

The second wing 132 may be formed on the second side with respect to the central line of the vibration plate 111, and may be formed of elastic material so that the first wing remains inclined to the second side when no external force is applied, and returns to its original state when external force is applied to cause the second wing to contact the first wing 131 and then the external force is eliminated.

In other words, the first and second wings 131 and 132 may be formed such that they are opened in opposite directions when no external force is applied, and they return to their original states when external force is applied to cause the first and second wings to contact each other and then the external force is eliminated.

Figure 5:
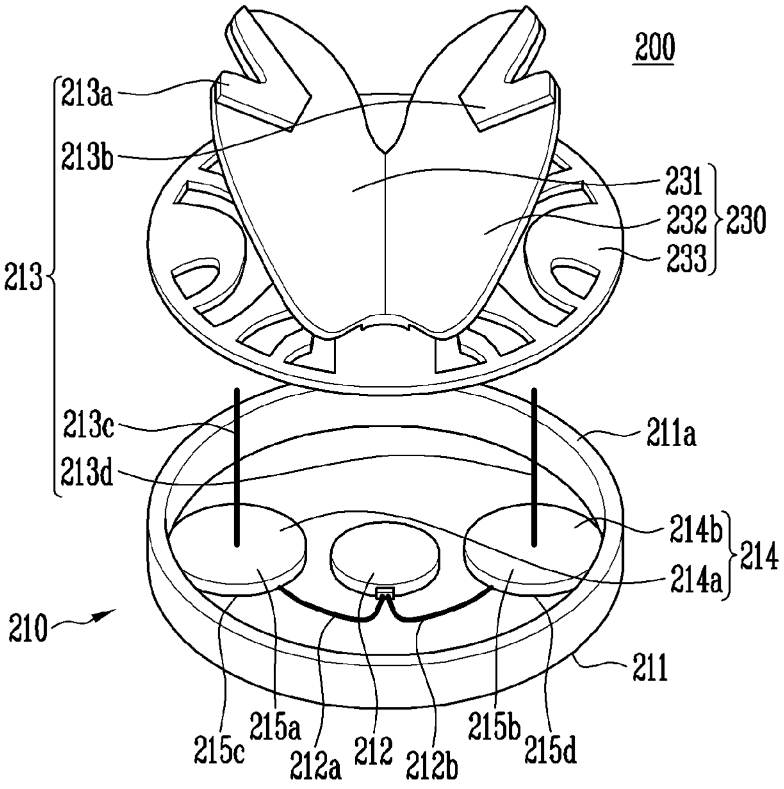
FIG. 5 is an exploded perspective view of a vibrating module according to a second embodiment of the present disclosure.
Figure 6:
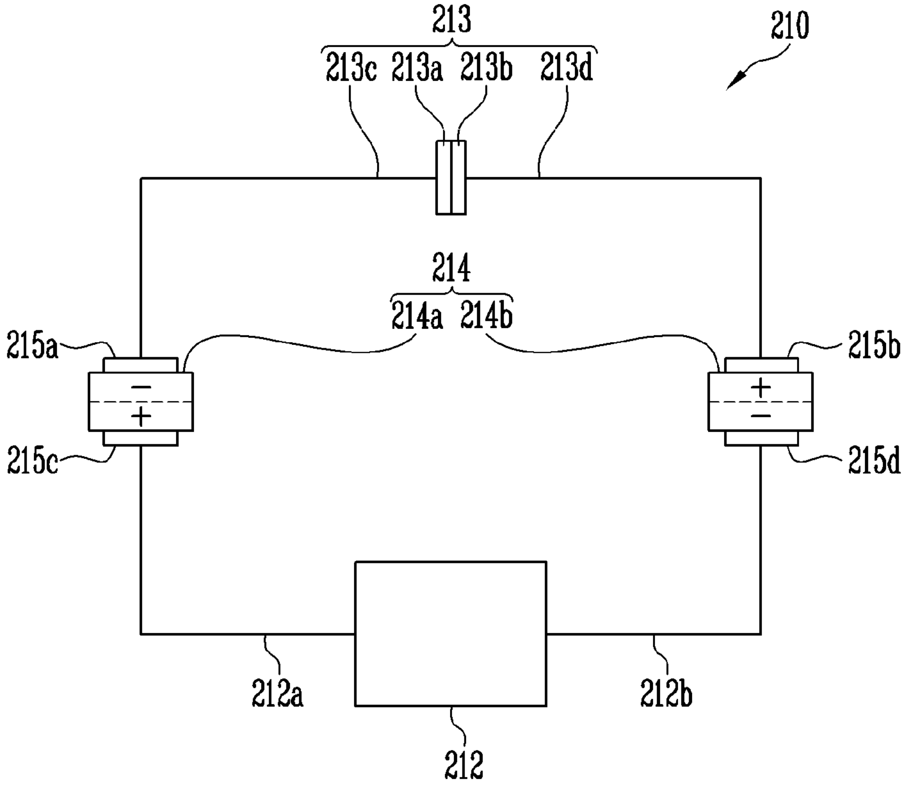
FIG. 6 is a circuit diagram of the vibrating module according to the second embodiment of the present disclosure.

FIG. 5 is an exploded perspective view of a vibrating module according to a second embodiment of the present disclosure, and FIG. 6 is a circuit diagram of the vibrating module according to the second embodiment of the present disclosure.

Referring to FIGS. 4A, 4B, and 6, a vibrating module 200 according to the second embodiment of the present disclosure may be detachably attached to a makeup tool 300, may function as a handle of the makeup tool 300, may vibrate the makeup tool 300, and may include a vibrating device 210 and a handle component 230.

The vibration device 210 and the handle component 230 of this embodiment are equal or similar in function to but are different in configuration from the vibrating device 110 and the handle component 130 of the first embodiment. This will be described below in detail.

The vibration device 210 may be driven when both wings of a pair of folding wing type handle components 230 are folded and contact each other, and may be attached to the makeup tool 300 to transfer vibration.

The vibration device 210 may be assembled with the handle component 230, and may be detachably attached to the makeup tool 300.

Such a vibration device 210 may include a vibration plate 211, a vibrator 212, a switch component 213, and a power supply component 214.

The vibration plate 211 may be coupled with a fixing plate 233 of the handle component 230.

The vibration plate 211 may be coupled with the fixing plate 233 of the handle component 230 in an assembling method, and may be fitted into a band or opening for the handle of the makeup tool 300 to be attached while contacting a surface of the makeup tool 300, thus allowing the vibrating force generated from the vibrator 212 to be uniformly transmitted to the makeup tool 300.

Similarly to the vibration plate 111 of the first embodiment, in case that the makeup tool 300 is flat while having no band or opening for the handle, the lower surface of the vibration plate 211 may be formed of a magic tape type to easily attach the vibration plate 211 to a surface of the makeup tool 300. Even if the makeup tool 300 has the band or opening for the handle to enable easy attachment, the lower surface of the vibration plate 211 may be formed of the magic tape type, and thereby the bond strength with the makeup tool 300 may be increased.

Such a vibration plate 211 may have an edge wall 211*a* to be assembled with the fixing plate 233 of the handle component 230 while accommodating the vibrator 212 and the power supply component 214.

The vibrator 212 may be mounted on the upper surface of the vibration plate 211, and may receive power from the power supply component 214 to generate vibration.

The vibrator 212 may be installed at the central portion of the vibration plate 211 to evenly transfer vibration throughout the vibration plate 211. Of course, the vibrator may be disposed in other portions.

When both wings of the pair of folding wing type handle components 230 are folded and contact each other, such a vibrator 212 may be provided with a first lead wire 212*a* and a second lead wire 212*b* to receive power from the power supply component 214.

The first lead wire 212*a* may be connected to an anode surface of the first battery 214*a* when the first battery 214*a* of the power supply component 214 is disposed on the vibration plate 211. At this time, the first lead wire 212*a* may be connected to the first battery 214*a* via a third fixing clip 215*c*. However, in case that the first battery 214*a* of the power supply component 214 is omitted, the first lead wire

212*a* may be directly connected to the first current carrying panel 213*a* of the switch component 213.

The second lead wire 212*b* may be connected to a cathode surface of the second battery 214*b* when the second battery 214*b* of the power supply component 214 is disposed on the vibration plate 211. At this time, the second lead wire 212*b* may be connected to the second battery 214*b* via a fourth fixing clip 215*d*. However, in case that the second battery 214*b* of the power supply component 214 is omitted, the second lead wire 212*b* may be directly connected to the second current carrying panel 213*b* of the switch component 213.

In the above, the third fixing clip 215*c* may be the positive-pole fixing clip shown in FIG. 7B, and the fourth fixing clip 215*d* may be the negative-pole fixing clip shown in FIG. 7A. Further, hereinafter, the first fixing clip 215*a* may be the negative-pole fixing clip shown in FIG. 7A, and the second fixing clip 215*b* may be the positive-pole fixing clip shown in FIG. 7B.

The switch component 213 may control the supply of power from the power supply component 214 to the vibrator 212, and may be installed at a pair of folding wing type handle components 230. The switch component 213 may include a first current carrying panel 213*a* and a second current carrying panel 213*b*.

The first current carrying panel 213*a* may be installed at an inside of the first wing 231, may be connected to the cathode surface of the first battery 214*a* via a first connecting line 213*c* in case that the first battery 214*a* of the power supply component 214 is disposed on the vibration plate 211, and may be directly connected to the first lead wire 212*a* of the vibrator 212 in case that the first battery 214*a* of the power supply component 214 is omitted.

The second current carrying panel 213*b* may be installed at an inside of the second wing 232 to be opposite to the first current carrying panel 213*a*, may be connected to the anode surface of the second battery 214*b* via a second connecting line 213*d* in case that the second battery 214*b* of the power supply component 214 is disposed on the vibration plate 211, and may be directly connected to the second lead wire 212*b* of the vibrator 212 in case that the second battery 214*b* of the power supply component 214 is omitted.

The first and second current carrying panels 213*a* and 213*b* contact each other when the first and second wings 231 and 232 are folded, thus allowing the power of the power supply component 214 to be supplied to the vibrator 212, and are separated from each other when the first and second wings 231 and 232 are unfolded, thus preventing the power of the power supply component 214 from being supplied to the vibrator 212. In this way, the switching function of controlling the supply of power may be performed.

As described above, the first and second current carrying panels 213*a* and 213*b* may be electrically connected to vibrate the vibrator 212 when a user simply causes the first and second wings 231 and 232 to contact each other regardless of pressure acting on the first and second wings 231 and 232. Further, as described in the first embodiment with reference to FIGS. 8A to 8D and FIGS. 9A to 9D, the first and second current carrying panels may be electrically connected to vibrate the vibrator 212 when a user presses the first and second wings 131 and 132 over a certain pressure in order to impart the vibrating function to the makeup tool 300 regardless of whether the first and second wings 131 and 132 contact each other, similarly or equally to the first and second current carrying panels 113*a* and 113*b* of the first embodiment. Herein, a detailed description thereof will be omitted to avoid a duplicated description.

The power supply component 214 may supply power to the vibrator 212, and may be a circular battery with one side being a positive pole and the other side being a negative pole.

One or more power supply components 214 may be disposed on the vibration plate 211.

In case that the power supply components 214 are disposed on opposite sides of the vibrator 212, the power supply components may include a first battery 214*a* and a second battery 214*b*, which will be described below.

The first battery 214*a* may be disposed on a first side of the vibrator 212. The anode surface of the first battery 214*a* may be connected to the first lead wire 212*a* of the vibrator 212 by the third fixing clip 215*c*, while the cathode surface thereof may be connected to the first connecting line 213*c* by the first fixing clip 215*a*. The first connecting line 213*c* may be an electric wire connecting the first battery 214*a* and the first current carrying panel 213*a* of the switch component 213.

The second battery 214*b* may be disposed on a second side of the vibrator 212. The cathode surface of the second battery 214*b* may be connected to the second lead wire 212*b* of the vibrator 212 by the fourth fixing clip 215*d*, while the anode surface thereof may be connected to the second connecting line 213*d* by the second fixing clip 215*b*. The second connecting line 213*d* may be an electric wire connecting the second battery 214*b* and the second current carrying panel 213*b* of the switch component 213.

The first battery 214*a* and the second battery 214*b* may form a serial structure with the switch component 213 having the first and second current carrying panels 213*a* and 213*b* being interposed therebetween, thus supplying power to the vibrator 212.

In this case, an electrical circuit configuration for supplying the power of the power supply component 214 to the vibrator 212 may be formed of the anode of the first battery 214*a*->the first lead wire 212*a*->the vibrator 212->the second lead wire 212*b*->the cathode of the second battery 214*b*->the second connecting line 213*d*->the second current carrying panel 213*b*->the first current carrying panel 213*a*->the first connecting line 213*c*->the cathode of the first battery 214*a*, and may be formed of an open circuit or a close circuit depending on whether the first and second current carrying panels 213*a* and 213*b* contact each other.

When the power supply component 214 is disposed on the first side of the vibrator 212, either of the first battery 214*a* and the second battery 214*b* may be omitted. A case where the second battery 214*b* is omitted will be described below.

The first battery 214*a* may be disposed on the first side of the vibrator 212. The anode surface of the first battery 214*a* may be connected to the first lead wire 212*a* of the vibrator 212 by the third fixing clip 215*c*, while the cathode surface thereof may be connected to the first connecting line 213*c* by the first fixing clip 215*a*. The first connecting line 213*c* may be an electric wire connecting the first battery 214*a* and the first current carrying panel 213*a* of the switch component 213.

Since the second battery 214*b* is omitted, the second current carrying panel 213*b* of the switch component 213 may be directly connected to the second lead wire 212*b* of the vibrator 212.

In this case, an electrical circuit configuration for supplying the power of the power supply component 214 to the vibrator 212 may be formed of the anode of the first battery 214*a*->the first lead wire 212*a*->the vibrator 212->the second lead wire 212*b*->the second current carrying panel 213*b*->the first current carrying panel 213*a*->the first connecting line 213*c*->the cathode of the first battery 214*a*, and may be formed of an open circuit or a close circuit depending on whether the first and second current carrying panels 213*a* and 213*b* contact each other.

When the power supply component 214 is disposed on the second side of the vibrator 212, either of the first battery 214*a* and the second battery 214*b* may be omitted. A case where the first battery 214*a* is omitted will be described below.

The second battery 214*b* may be disposed on the second side of the vibrator 212. The cathode surface of the second battery 214*b* may be connected to the second lead wire 212*b* of the vibrator 212 by the fourth fixing clip 215*d*, while the anode surface thereof may be connected to the second connecting line 213*d* by the second fixing clip 215*b*. The second connecting line 213*d* may be an electric wire connecting the second battery 214*b* and the second current carrying panel 213*b* of the switch component 213.

Since the first battery 214*a* is omitted, the first current carrying panel 213*a* of the switch component 213 may be directly connected to the first lead wire 212*a* of the vibrator 212.

In this case, an electrical circuit configuration for supplying the power of the power supply component 214 to the vibrator 212 may be formed of the anode of the second battery 214*b*->the second connecting line 213*d*->the second current carrying panel 213*b*->the first current carrying panel 213*a*->the first lead wire 212*a*->the vibrator 212->the second lead wire 212*b*->the cathode of the second battery 214*b*, and may be formed of an open circuit or a close circuit depending on whether the first and second current carrying panels 213*a* and 213*b* contact each other.

The handle component 230 may be assembled with the vibration device 210, and may function as the handle of the makeup tool 300 when the vibrating module 200 is attached to the makeup tool 300.

Furthermore, the handle component 230 may be of the pair of folding wing type structure, and may perform a switching function for driving the vibrating device 210 when both wings are folded to contact each other.

Such a handle component 230 may include the first wing 231, the second wing 232, and the fixing plate 233.

The first and second wings 231 and 232 may be manufactured integrally with the fixing plate 233, and may perform the switching function as well as the handle function of the makeup tool 300, when the vibrating module 200 is attached to the makeup tool 300.

Furthermore, the first and second wings 231 and 232 themselves may be formed of elastic material or material different from the elastic material, for example, hard material.

The first wing 231 may be formed on the first side with respect to the central line of the fixing plate 233, and may be formed of elastic material so that the first wing remains inclined to the first side when no external force is applied, and returns to its original state when external force is applied to cause the first wing to contact the second wing 232 and then the external force is eliminated.

The second wing 232 may be formed on the second side with respect to the central line of the fixing plate 233, and may be formed of elastic material so that the second wing remains inclined to the second side when no external force is applied, and returns to its original state when external force is applied to cause the second wing to contact the first wing 231 and then the external force is eliminated.

In other words, the first and second wings 231 and 232 may be formed such that they are opened in opposite directions when no external force is applied, and they return to their original states when external force is applied to cause the first and second wings to contact each other and then the external force is eliminated.

Although not shown in the drawings, the first and second wings 231 and 232 may be assembled with each other as in the first embodiment. In this case, as described above, the first and second wings 131 and 132 of the first embodiment are assembled with the vibration plate 211 by the coupler 120 provided on the upper surface of the vibration plate 211. Similarly to the first embodiment, the first and second wings 231 and 232 of this embodiment may be manufactured in the assembling method by providing the coupler 120 on the fixing plate 233.

The first and second wings 231 and 232 may be mounted on the upper surface of the fixing plate 233.

Such a fixing plate 233 may be manufactured integrally with the first and second wings 231 and 232, and may be assembled with the edge wall 211*a* of the vibration plate 211.

Furthermore, the fixing plate 233 may be assembled with the edge wall 211*a* of the vibration plate 211 to protect components such as the vibrator 212 and the power supply component 214 mounted on the upper surface of the vibration plate 211.

Figure 10:
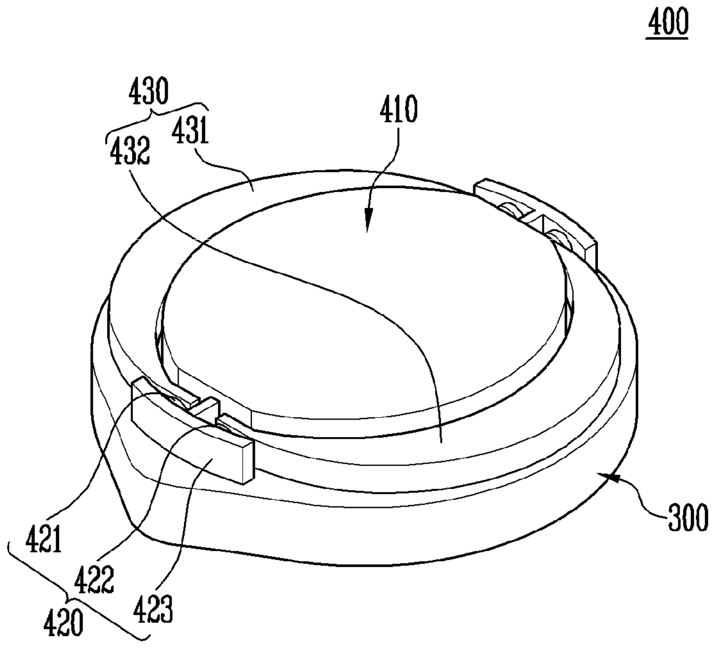
FIG. 10 is a perspective view illustrating a vibrating module according to a third embodiment of the present disclosure.
Figure 11:
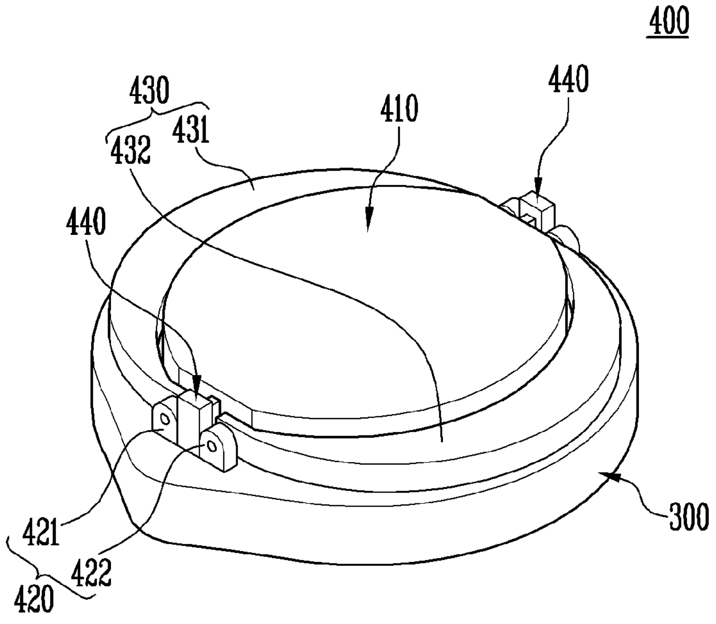
FIG. 11 is a perspective view illustrating a state in which a short-circuit preventing component is installed in the vibrating module of FIG. 10.
Figure 12A:
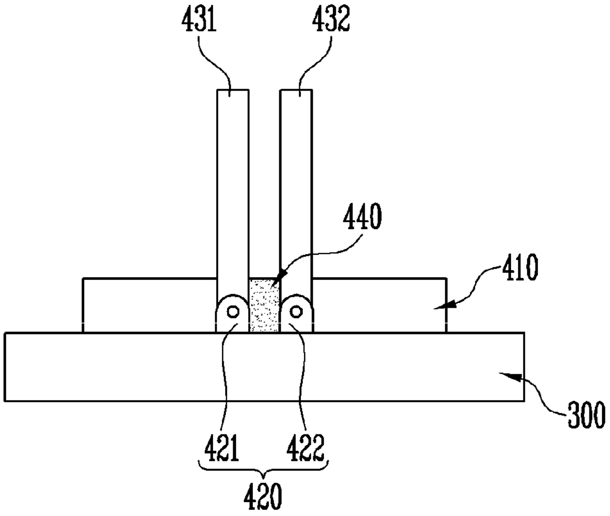
FIGS. 12A and 12B are diagrams illustrating the operating state of the short-circuit preventing component of FIG. 11.
Figure 12B:
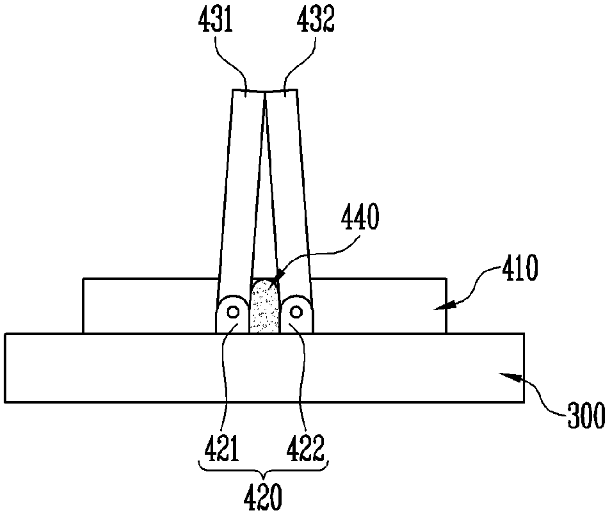
Figure 13:
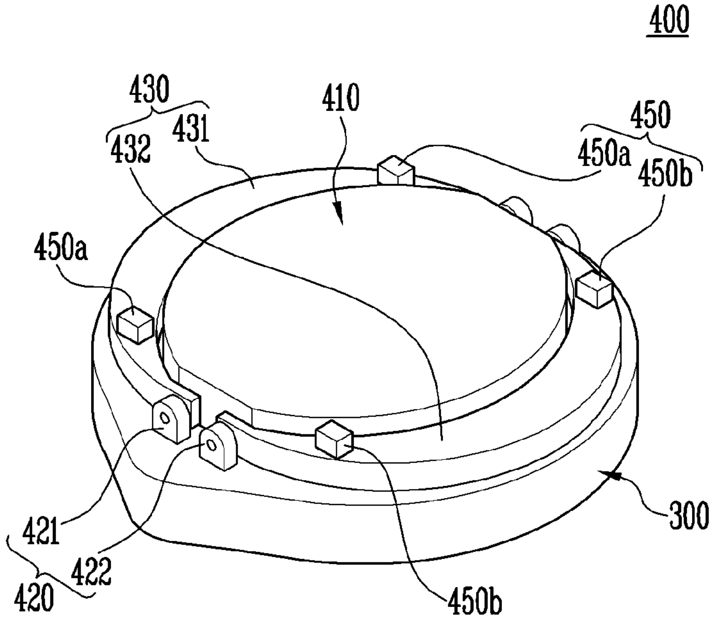
FIG. 13 is a perspective view illustrating a state in which another short-circuit preventing component is installed in the vibrating module of FIG. 10.
Figure 14A:
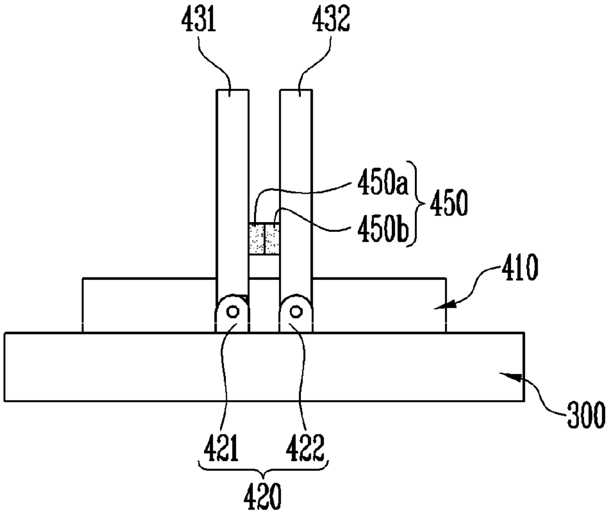
FIGS. 14A and 14B are diagrams illustrating the operating state of the short-circuit preventing component of FIG. 13.
Figure 14B:
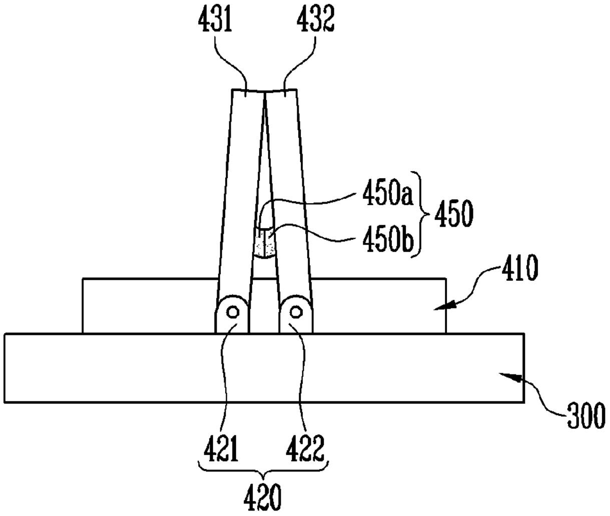
Figure 15:
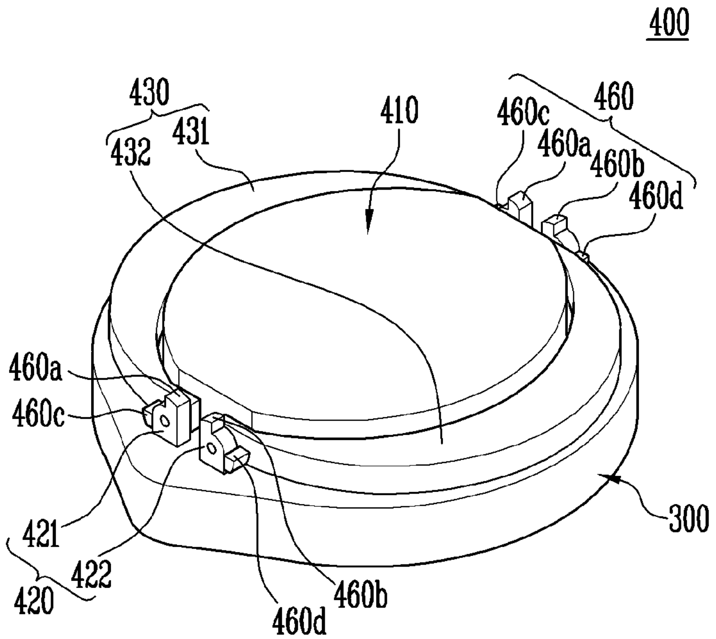
FIG. 15 is a perspective view illustrating a state in which a further short-circuit preventing component is installed in the vibrating module of FIG. 10.
Figure 16A:
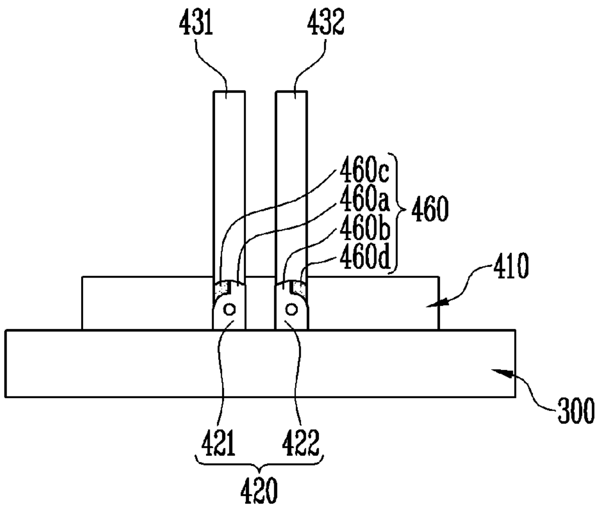
FIGS. 16A and 16B are diagrams illustrating the operating state of the short-circuit preventing component of FIG. 15.
Figure 16B:
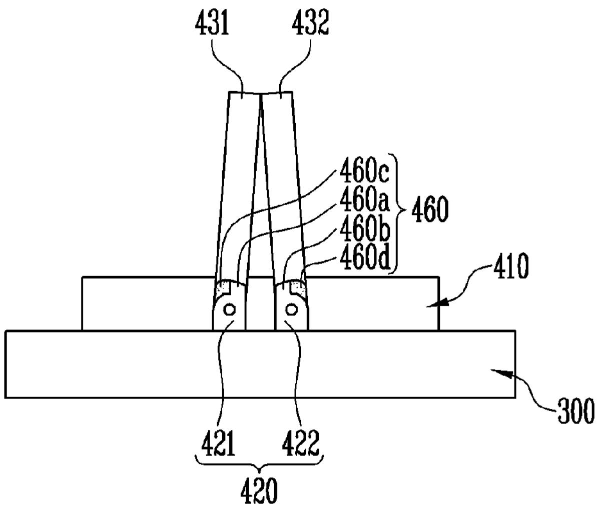

FIG. 10 is a perspective view illustrating a vibrating module according to a third embodiment of the present disclosure, FIG. 11 is a perspective view illustrating a state in which a short-circuit preventing component is installed in the vibrating module of FIG. 10, FIGS. 12A and 12B are diagrams illustrating the operating state of the short-circuit preventing component of FIG. 11, FIG. 13 is a perspective view illustrating a state in which another short-circuit preventing component is installed in the vibrating module of FIG. 10, FIGS. 14A and 14B are diagrams illustrating the operating state of the short-circuit preventing component of FIG. 13, FIG. 15 is a perspective view illustrating a state in which a further short-circuit preventing component is installed in the vibrating module of FIG. 10, and FIGS. 16A and 16B are diagrams illustrating the operating state of the short-circuit preventing component of FIG. 15.

FIGS. 12A, 14A, and 16A illustrate a case where no external force is applied to the first wing 431 and the second wing 432, and FIGS. 12B, 14B, and 16B illustrate a case where external force is applied to the first wing 431 and the second wing 432.

Referring to FIG. 10, a vibrating module 400 according to the third embodiment of the present disclosure may be detachably attached to a makeup tool 300, may function as a handle of the makeup tool 300, may vibrate the makeup tool 300, and may include a vibrating device 410, a coupler 420, and a handle component 430. The vibration device 410 and the handle component 430 may be coupled by the coupler 420.

The vibration device 410, the coupler 420, and the handle component 430 of this embodiment are partially equal or similar in function/structure to but are partially different from the vibrating device 110, the coupler 120, and the handle component 130 of the first embodiment, or the vibration device 210 and the handle component 230 of the second embodiment. Hereinafter, in order to avoid the duplicated description of the same or similar function/structure, only a different function/structure will be described in detail.

The vibration device 410 may transfer vibration to the makeup tool 300 having the application surface, and may include a vibration plate, a vibrator, and a power supply component.

The vibration plate of this embodiment may be similar in structure to the vibration plate 111 of the first embodiment or the vibration plate 211 of the second embodiment. This embodiment may be more similar to the vibration plate 211 having the edge wall 211*a* of the second embodiment in that the battery is accommodated not in the handle component 430 but in the vibration device 410.

In other words, the vibration device 410 of this embodiment may be formed of a box structure having an upper surface, a lower surface, and a side surface. The overall shape of the vibration device 410 may be an elliptical shape, and may be formed of various shapes such as a circle without being limited thereto.

The vibrator configured to generate vibration and the power supply component configured to supply power to the vibrator may be mounted on the upper surface of the vibration plate. Here, the vibrator and the power supply component may be similar in structure to the vibrator 212 and the power supply component 214 including the first and second batteries 214*a* and 214*b* of the second embodiment, but the present disclosure is not limited thereto.

The coupler 420 may rotatably connect the handle component 430 to the vibration device 410.

The coupler 420 may be installed at each of first and second sides of the vibration device 410, and may include a first hinge 421 and a second hinge 422 to assemble first and second wings 431 and 432 of the handle component 430. The coupler 420 may further include a cover 423 to provide a good appearance while preventing the first and second hinges 421 and 422 from being seen from the outside.

The first and second hinges 421 and 422 may be mounted on the side surface of the vibration device 410, and may be mounted on the upper surface of the vibration device 410 as in the first and second hinges 121 and 122 of the first embodiment.

The handle component 430 may be rotatably assembled with the vibration device 410 by the first and second hinges 421 and 422 of the coupler 420, and may include the first wing 431 and the second wing 432.

Similarly to the handle components 130 and 230 of the first and second embodiments, the handle component 430 of this embodiment may perform a switching function for driving the vibrating device 410 when both wings 431 and 432 are folded to contact each other. The first and second wings 431 and 432 of this embodiment themselves perform a switching function, unlike the first and second embodiments where the current carrying panels 113*a*, 113*b*, 213*a* and 213*b* are mounted on the wings to perform a switch function.

In other words, the first and second wings 431 and 432 of this embodiment may be formed of conductive material, e.g., metal having rigidity or an elastic conductor having a certain degree of ductility. Thus, the current carrying panels 113*a*, 113*b*, 213*a*, and 213*b* provided in the wings 131, 132, 231, and 232 of the first and second embodiments are not required.

Each of the first and second wings 431 and 432 formed of the conductive material is directly connected to the power supply component to perform the switch function. A configuration for connecting each of the first and second wings 431 and 432 to the power supply component may be implemented based on the above-described first and second embodiments. Here, a detailed description thereof is omitted.

The first and second wings 431 and 432 of this embodiment may be formed in a semi-ring shape. However, without being limited thereto, the wings may have the same shape as the wings 131, 132, 231, and 232 of the first and second embodiment, and may be formed in various shapes.

In case that the first and second hinges 421 and 422 are mounted on the upper surface of the vibration device 410, the first and second wings 431 and 432 may be placed on the upper surface of the vibration device 410 when being opened. In case that the first and second hinges 421 and 422 are mounted on the side surface of the vibration device 410, the wings may be placed on the side surface of the vibration device 410 when being opened.

As described above, the first and second wings 431 and 432 of this embodiment may be rotatably connected to the first and second hinges 421 and 422, and the first and second wings themselves perform a switch function. Here, the first and second wings 431 and 432 may unintentionally contact each other to drive the vibration device 410. Therefore, a short-circuit preventing means is required to prevent the unintended contact of the first and second wings 431 and 432. Hereinafter, various short-circuit preventing means will be described with reference to the accompanying drawings.

Referring to FIGS. 11, 12A, and 12B, a short-circuit preventing component 440 may be provided as the short-circuit preventing means of the first and second wings 431 and 432.

The short-circuit preventing component 440 may be configured to cause the first wing 431 and the second wing 432 to contact each other only when external force exceeding a certain pressure is applied thereto. At least one short-circuit preventing component may be installed in the vibration device 410 to be positioned between the first wing 431 and the second wing 432.

In case that each of the first and second wings 431 and 432 has a semi-ring shape and the first and second hinges 421 and 422 are installed in the edge wall of the vibration device 410 as in this embodiment, the short-circuit preventing component 440 may be installed in the edge wall of the vibration device 410 between the first and second hinges 421 and 422. In case that each of the first and second wings 131 and 132 has a semi-disc shape and the first and second hinges 121 and 122 are mounted on the upper surface of the vibrating device 110 as in the first embodiment, one or more short-circuit preventing component(s) may be variously installed between the first and second wings 131 and 132 to protrude from the upper surface of the vibrating device 110 to a certain height. Here, the short-circuit preventing component 440 may be made of an elastic material having electric insulation, may be provided integrally with the vibration device 410, or may be mounted separately from the vibration device 410.

Referring to FIGS. 13, 14A, and 14B, another short-circuit preventing component 450 may be provided as the short-circuit preventing means of the first and second wings 431 and 432.

The short-circuit preventing component 450 may be configured to cause the first wing 431 and the second wing 432 to contact each other only when external force exceeding a certain pressure is applied thereto. The short-circuit preventing component may include at least one first short-circuit preventing member 450*a* provided on the inner surface of the first wing 431, and at least one second short-circuit preventing member 450*b* provided on the inner surface of the second wing 432 to be opposite to the first short-circuit preventing member 450*a*.

Each of the first and second wings 431 and 432 may have the semi-ring shape in this embodiment, and each of the first and second hinges 131 and 132 may have the semi-disc shape as in the first embodiment. Thus, regardless of the shape of the wing, one or more first and second short-circuit preventing members 450*a* and 450*b* may be variously installed at opposite positions to protrude to a certain height. Here, at least one of the first and second short-circuit preventing members 450*a* and 450*b* may be made of an elastic material having electric insulation.

Referring to FIGS. 15, 16A, and 16B, a further short-circuit preventing component 460 may be provided as the short-circuit preventing means of the first and second wings 431 and 432.

The short-circuit preventing component 460 may be configured to cause the first wing 431 and the second wing 432 to contact each other only when external force exceeding a certain pressure is applied thereto. The short-circuit preventing component may include a first short-circuit preventing member 460*a* provided on the first hinge 421, a second short-circuit preventing member 460*b* provided on the second hinge 422, a third short-circuit preventing member 460*c* provided on the first wing 431 to be opposite to the first short-circuit preventing member 460*a*, and a fourth short-circuit preventing member 460*d* provided on the second wing 432 to be opposite to the second short-circuit preventing member 460*b*.

The first, second, third, and fourth short-circuit preventing members 460*a*, 460*b*, 460*c*, and 460*d* may be formed of elastic material having electric insulation, and may be formed of general elastic material because they are not related to the direct contact of the first wing 431 and the second wing 432.

The short-circuit preventing components 440, 450, and 460 may prevent the vibration device 410 from being driven due to the unintended contact of the first wing 431 and the second wing 432. In case that the first wing 431 and the second wing 432 are configured to be freely rotatable unlike the first embodiment, the short-circuit preventing components may be useful.

In other words, even if the first wing 431 and the second wing 432 are configured to be freely rotatable, unless external force is applied to the first wing 431 and the second wing 432 as shown in FIGS. 12A, 14A, and 16A, the first wing 431 and the second wing 432 maintain a non-contact state by the short-circuit preventing component 440, 450, or 460. Only when external force is applied to the first wing 431 and the second wing 432 as shown in FIGS. 12B, 14B, and 16B, the short-circuit preventing component 440, 450, or 460 may be contracted, thus allowing portions (e.g. upper ends) of the first wing 431 and the second wing 432 to contact each other.

The present disclosure is not limited to the embodiments described above, and a combination of the embodiments or a combination of at least one of the embodiments and a known technology may be included as another embodiment.

While various exemplary embodiments have been described above, those skilled in the art will appreciate that various modifications, additions and substitutions are possible, without departing from the scope and spirit of the present disclosure. Therefore, modifications and variations that may be easily derived from the embodiments of the present disclosure should be interpreted as being included in the present disclosure.

100: vibrating module
110: vibration device
111: vibration plate
112: vibrator
112a: first lead wire
112b: second lead wire
113: switch component
113a: first current carrying panel
113b: second current carrying panel
114: power supply component
114a: first battery
114b: second battery
115a: first fixing clip
115b: second fixing clip
120: coupler
121: first hinge
122: second hinge
130: handle component
131: first wing
131a: first groove
132: second wing
132a: second groove
200: vibrating module
210: vibration device
211: vibration plate
211a: edge wall
212: vibrator
212a: first lead wire
212b: second lead wire
213: switch component
213a: first current carrying panel
213b: second current carrying panel
213c: first connecting line
213d: second connecting line
214: power supply component
214a: first battery
214b: second battery
215a: first fixing clip
215b: second fixing clip
215c: third fixing clip
215d: fourth fixing clip
230: handle component
231: first wing
232: second wing
233: fixing plate
300: makeup tool
400: vibrating module
410: vibration device
420: coupler
421: first hinge
422: second hinge
423: cover
430: handle component
431: first wing
432: second wing
440, 450, 460: short-circuit preventing component
450a, 460a: first short-circuit preventing member
450b, 460b: second short-circuit preventing member
460c: third short-circuit preventing member
460d: fourth short-circuit preventing member
EG: elastic groove
EB: elastic bar

The invention claimed is:

1. A vibrating module, comprising:

a vibration device comprising a vibration plate detachably attached to a makeup tool, and transferring vibration to the makeup tool; and a handle component coupled with the vibration device, including a pair of folding wings, the pair of folding wings comprising a first wing and a second wing, the handle component being configured to drive the vibration device when the first folding wing and the second folding wing are folded and contact each other, wherein when the vibration plate is attached to the makeup tool, the makeup tool is disposed under a lower surface of the vibration plate, and the handle component is disposed on an upper surface of the vibration plate.

2. The vibrating module according to claim 1, wherein the vibration device further comprises:

a vibrator mounted on the upper surface of the vibration plate and generating vibration;

a power supply component installed in the handle component and supplying power to the vibrator; and a switch component installed in the handle component and controlling supply of the power from the power supply component to the vibrator.

3. The vibrating module according to claim 2, wherein the power supply component comprises at least any one of a first battery and a second battery, wherein the first battery is disposed on the first wing, the first battery including an anode surface connected to the vibrator through a first lead wire, and a cathode surface connected to the switch component, and wherein the second battery is disposed on the second wing, the second battery including a cathode surface connected to the vibrator through a second lead wire, and an anode surface connected to the switch component.

4. The vibrating module according to claim 3, wherein the switch component comprises a first current carrying panel and a second current carrying panel, wherein the first current carrying panel is installed at the first wing, contacts with the cathode surface of the first battery and is connected to the cathode surface of the first battery, and wherein the second current carrying panel is installed at the second wing, contacts with the anode surface of the second battery, and is connected to the anode surface of the second battery.

5. The vibrating module according to claim 4, wherein the first current carrying panel is installed at an inside of the first wing, wherein the second current carrying panel is installed at an inside of the second wing such that the second current carrying panel is opposite to the first current carrying panel, and wherein the first current carrying panel and the second first current carrying panel contact to be electrically connected to each other when the first wing and the second wing contact each other regardless of pressure acting on the first wing and the second wing.

6. The vibrating module according to claim 4, wherein the first current carrying panel is installed in a concave first elastic groove defined in the first wing, wherein the second current carrying panel is installed in a concave second elastic groove defined in the second wing to be opposite to the first elastic groove, and wherein the first current carrying panel and the second first current carrying panel contact to be electrically connected to each other when the first wing and the second wing of the first and second elastic grooves are pressed over a certain pressure in a state where the first wing and the second wing contact each other.

7. The vibrating module according to claim 4, further comprising:

a first elastic bar provided on an inner surface of the first wing to have a certain inner inclination; and a second elastic bar provided to be opposite to the first elastic bar and provided on an inner surface of the second wing to have a certain inner inclination, wherein the first current carrying panel is installed at an inside of the first wing, wherein the second current carrying panel is installed at an inside of the second wing to be opposite to the first current carrying panel, and wherein the first current carrying panel and the second first current carrying panel contact to be electrically connected to each other as an angle of the first elastic bar and the second elastic bar is reduced when the first wing and the second wing are pressed over a certain pressure in a state where the first wing and the second wing are folded and the first elastic bar and the second elastic bar contact each other.

8. The vibrating module according to claim 7, wherein each of the first current carrying panel and the second first current carrying panel is installed in a groove defined in each of the first wing and the second wing, and is installed such that an outer surface thereof is parallel to the inner surface of each of the first wing and the second wing, and wherein each the first elastic bar and the second elastic bar is inserted into another groove defined in each of the first wing and the second wing to cause the first current carrying panel and the second first current carrying panel to contact each other as the angle is reduced if the certain pressure is applied, and returns to an original state thereof if the certain pressure is released.

9. A vibrating module, comprising:

a vibration device detachably attached to a makeup tool, and transferring vibration to the makeup tool; and a handle component coupled with the vibration device, including a pair of folding wings, the pair of folding wings comprising a first wing, a second wing and a fixing plate on which the first wing and the second wing are mounted, and the handle component being configured to drive the vibration device when the first folding wing and the second folding wing are folded and contact each other, wherein the vibration device comprises:

a vibration plate detachably attached to the makeup tool, and coupled with the fixing plate;

a vibrator mounted on an upper surface of the vibration plate and generating vibration;

a power supply component mounted on the upper surface of the vibration plate and supplying power to the vibrator; and a switch component installed in the handle component and controlling supply of the power from the power supply component to the vibrator.

10. The vibrating module according to claim 9, wherein the power supply component comprises at least any one of a first battery and a second battery, wherein the first battery is disposed on a first side of the vibrator, the first battery including an anode surface connected to the vibrator through a first lead wire, and a cathode surface connected to the switch component through a first connecting line, and wherein the second battery is disposed on a second side of the vibrator, the second battery including a cathode surface connected to the vibrator through a second lead wire, and an anode surface connected to the switch component through a second connecting line.

11. The vibrating module according to claim 10, wherein the switch component comprises a first current carrying panel and a second current carrying panel, wherein the first current carrying panel is installed at an inside of the first wing, and is connected through the first connecting line to the cathode surface of the first battery, wherein the second current carrying panel is installed at an inside of the second wing, and is connected through the second connecting line to the anode surface of the second battery, and wherein the first current carrying panel and the second first current carrying panel are electrically connected to vibrate the vibrator when the first wing and the second wing contact each other regardless of pressure acting on the first wing and the second wing, or are electrically connected to vibrate the vibrator when the first wing and the second wing are pressed over a certain pressure regardless of whether the first wing and the second wing contact each other.

12. The vibrating module according to claim 1, wherein the makeup tool is a puff, a cleanser, an applicator, a pen, or a brush.

13. The vibrating module according to claim 1, wherein the vibration device is configured to generate vibration on an application surface regardless of whether the application surface contacts skin, if the first wing and the second wing are folded in a direction where they the first wing and the second wing are erected towards an opposite side of the application surface of the makeup tool and contact each other.

14. A vibrating module, comprising:

a vibration device detachably attached to a makeup tool, and transferring vibration the makeup tool;

a handle component rotatably assembled with the vibration device by a first hinge and a second hinge, and including a pair of folding wings, the pair of folding wings comprising a first wing and a second wing the handle component being configured to drive the vibration device when the first wing and the second wing are folded and contact each other, thereby transferring vibration to the makeup tool; and a short-circuit preventing component between the first wing and the second wing such that the first wing and the second wing to contact each other only when an external force is applied, the short-circuit preventing component comprising an electric insulation material.

15. The vibrating module according to claim 14, wherein at least one short-circuit preventing component is between the first wing and the second wing, protrudes on the vibration device, and is formed of elastic material having electric insulation.

16. The vibrating module according to claim 14, wherein the short-circuit preventing component comprises:

at least one first short-circuit preventing member on an inner surface of the first wing; and at least one second short-circuit preventing member on an inner surface of the second wing to be opposite to the first short-circuit preventing member, wherein any one of the at least one first short-circuit preventing member and the at least one second short-circuit preventing member is formed of elastic material having electric insulation.

17. The vibrating module according to claim 14, wherein the short-circuit preventing component comprises:

a first short-circuit preventing member provided on the first hinge;

a second short-circuit preventing member provided on the second hinge;

a third short-circuit preventing member provided on the first wing to be opposite to the first short-circuit preventing member; and a fourth short-circuit preventing member provided on the second wing to be opposite to the second short-circuit preventing member, wherein the first to fourth short-circuit preventing members are formed of elastic material.

18. The vibrating module according to claim 14, wherein the vibration device comprises:

a vibrator configured to transfer vibration to a vibration plate; and a power supply component configured to supply power to the vibrator, wherein each of the first wing and the second wing is formed of conductive material and is connected to the power supply component to perform a switch function for controlling the supply of power to the vibrator.

19. The vibrating module according to claim 14, wherein the makeup tool is a puff, a cleanser, an applicator, a pen, or a brush.

* * * * *